United States Patent
Lee et al.

(10) Patent No.: US 6,952,832 B2
(45) Date of Patent: Oct. 4, 2005

(54) OPTICAL DISK READING DEVICE HAVING TWO WAYS TO LOAD A DISK

(75) Inventors: Cheng-Fu Lee, Hsinchu (TW); Tsung Jung Kuo, Kaohsiung (TW); In-Shuen Lee, Taipei (TW); Cheng-Chung Hsu, Taipei (TW)

(73) Assignee: Lite-On IT Corp., Taiwan (CN)

( * ) Notice: Subject to any disclaimer, the term of this patent is extended or adjusted under 35 U.S.C. 154(b) by 500 days.

(21) Appl. No.: 10/080,799

(22) Filed: Feb. 22, 2002

(65) Prior Publication Data

US 2003/0090984 A1 May 15, 2003

(30) Foreign Application Priority Data

Nov. 13, 2001 (TW) ........................... 90219513 U

(51) Int. Cl.[7] ................................. G11B 17/03
(52) U.S. Cl. ........................................ 720/624
(58) Field of Search ..................... 720/624, 617, 720/619; 369/77.1, 77.2, 75.1, 75.2

(56) References Cited

U.S. PATENT DOCUMENTS 4,118,038 A * 10/1978 Watanabe ................... 369/63
4,123,065 A * 10/1978 Watanabe ................. 369/77.1
4,574,370 A * 3/1986 Koike ......................... 369/65

* cited by examiner

*Primary Examiner*—David D. Davis
(74) *Attorney, Agent, or Firm*—Raymond Sun

(57) ABSTRACT

A disk reading device operates in both a suction mode and a cover-lifting mode. The device has a lower cover having a wall with an elongated opening provided in the wall, an upper cover that is connected for pivoting movement with respect to the lower cover, and a disk receiving space between the lower and upper covers. The disk receiving space is accessible via the elongated opening in a suction mode and by opening the upper cover with respect to the lower cover in a cover-lifting mode. A disk is drawn via the elongated opening into the disk receiving space, or a disk can be manually placed in the disk receiving space by opening the upper cover with respect to the lower cover. The device also includes a switch that switches operation of the disk reading device from the suction mode to the cover-lifting mode.

12 Claims, 8 Drawing Sheets

OPTICAL DISK READING DEVICE HAVING TWO WAYS TO LOAD A DISK

BACKGROUND OF THE INVENTION

1. Field of the Invention

The present invention relates to an optical disk reading device, and in particular, to an optical disk reading device that has two disk loading and ejection systems.

2. Description of the Prior Art

Since a normal optical disk reading device (such as a disk drive) uses a replaceable optical disk as a data recording medium, it must have disk loading and disk ejection functions. The conventional disk loading and disk ejection methods include drag-plate type, suction type, and cover-lifting type, which are incompatible with each other and which have their own application fields.

The suction type optical disk drive has the easiest disk loading and disk ejection system for the user to operate, and the suction opening through which the disk is loaded or ejected can face any direction. Suction type optical disk drives are enjoyed by many users and are most commonly used in automobiles. However, the recent diversification of the external appearances of optical disks means that many optical disks are now provided with irregular external shapes. Unfortunately, optical disks with irregular external shapes cannot always be loaded or ejected using the suction type mechanism. This is the largest hindrance to the application of the suction type optical disk drive.

The cover-lifting optical disk drive has different characteristics from the suction type optical disk drive. For example, it is more complicated to use since the user must lift the cover to load or remove a disk. However, cover-lifting disk drives have the highest compatibility with a wide variety of optical disks that have different and irregular external shapes. In other words, cover-lifting disk drives can load an optical disk having almost any shape.

As shown in FIGS. 1 and 2, the conventional standard 8-cm and 12-cm optical disks 10a and 11a, respectively, can be loaded into and ejected from virtually all general optical disk reading devices. However, the conventional but irregular name card-shaped optical disk 12a (see FIG. 3) and Christmas tree-shaped optical disk 13a (see FIG. 4) can only be loaded into and ejected from cover-lifting type optical disk reading devices, and are typically loaded manually.

Thus, there remains a need for an optical disk reading device that allows for convenient and effective loading and removal of optical disks that have virtually any external shape.

SUMMARY OF THE DISCLOSURE

It is an object of the present invention to provide an optical disk reading device that allows for convenient and effective loading and removal of optical disks that have virtually any external shape.

It is another object of the present invention to provide an optical disk reading device that has two disk loading and ejection systems.

In order to accomplish the objects of the present invention, the present invention provides a disk reading device that can operate in a suction mode and in a cover-lifting mode. The device has a lower cover having a wall with an elongated opening provided in the wall, an upper cover that is connected for pivoting movement with respect to the lower cover, and a disk receiving space between the lower and upper covers. The disk receiving space is accessible via the elongated opening in a suction mode and by opening the upper cover with respect to the lower cover in a cover-lifting mode. A disk can be drawn via the elongated opening into the disk receiving space, or a disk can be manually placed in the disk receiving space by opening the upper cover with respect to the lower cover. The device also includes a switch that switches operation of the disk reading device from the suction mode to the cover-lifting mode.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
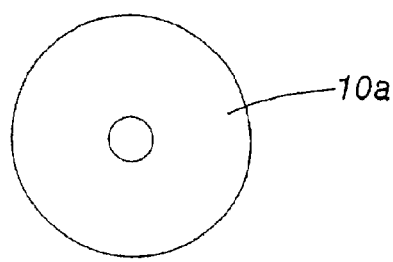
FIGS. 1–4 are top plan views illustrating four different types of conventional optical disks.
Figure 2:
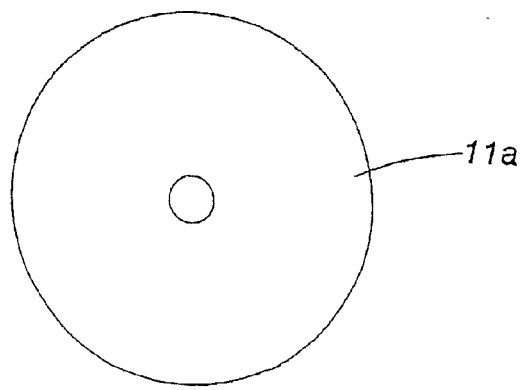
Figure 3:
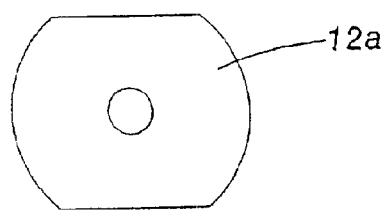
Figure 4:
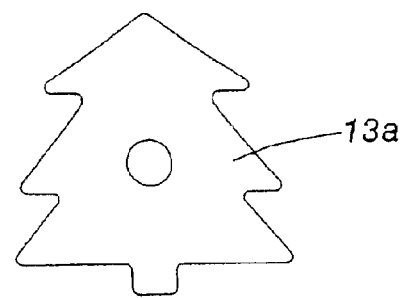
Figure 5:
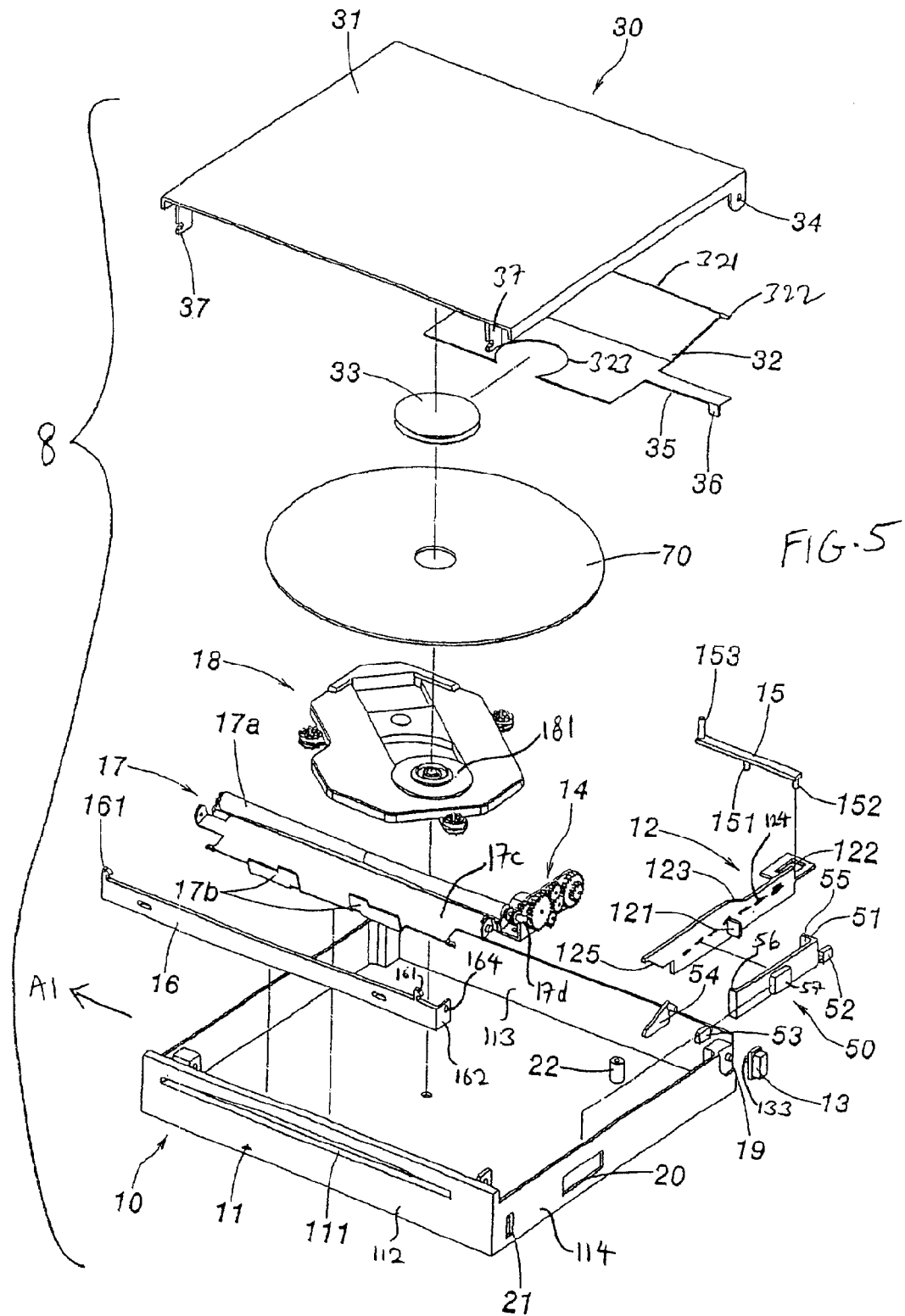
FIG. 5 is an exploded perspective view of an optical disk reading device according to the present invention.

FIG. 5 illustrates an optical disk reading device according to one embodiment of the present invention. The disk reading device is embodied in the form of an optical disk drive 8, although the principles of the present invention can be applied to other optical disk reading or access devices, such as but not limited to disk drives, CD-ROM drives, DVD-ROM drives, and CD-RWs, among others. The present invention provides an optical disk drive 8 that has two types of disk loading and ejection systems. The optical disk drive 8 has a housing that includes a lower cover assembly 10 and an upper cover assembly 30. The lower cover assembly 10 has a lower cover 11, which is a hollow case having four walls and an opened top. An elongated and slim disk suction opening 111 is formed on the front wall 112 of the lower cover 11. A control rack 12, a cover-lifting button 13, a motor and decelerating gear unit 14, a clamp-actuating push rod 15, a connecting rod 16, a roller unit 17, a data reading unit 18, and a function switching device 50 are all arranged inside the lower cover 11, as described in greater detail hereinbelow. The cover-lifting button 13 is positioned in a button hole 21 that is formed on a side wall 114 of the lower cover 11.

The control rack 12 is positioned inside the lower cover 11, and is configured as an elongated vertical plate having an extension 121 that extends transversely from an outer vertical surface of the vertical plate, a first guiding surface 123, and a second guiding surface 125. Both guiding surfaces 123 and 125 are angled with respect to the horizontal axis. The first guiding surface 123 is positioned along the top edge and at about the center of the vertical plate, and the second guiding surface 125 is positioned adjacent the bottom edge and at the front of the vertical plate. As used herein, the term "front" shall mean adjacent or towards the front wall 112, and the term "rear" shall mean adjacent or towards the rear wall 113 of the lower cover 11. A horizontal driving hole 122 is formed at the rear end of the control rack 12. In addition, a toothed edge 124 is formed on an inner surface (opposite the extension 121) of the control rack 122 (see also FIG. 10) and is adapted to engage the gear of the motor and decelerating gear unit 14.

The push rod 15 has a pivot 151 that is positioned at the bottom of push rod 15, and the pivot 151 is supported and pivoted on a pivot stand 22 that is provided on the base of the lower cover 11. A first axle 152 and a second axle 153 are provided at the two opposing ends of the push rod 15. The first axle 152 extends downwardly from the push rod 15 and is adapted to be fitted in the driving hole 122 of the control rack 12 to connect one end of the push rod 15 to the control rack 12. The second axle 153 extends upwardly from the push rod 15 and is positioned below a clamp support 32 so that the push rod 15 is positioned between the control rack 12 and the clamp support 32.

The connecting rod 16 functions to secure the upper cover 30 to the lower cover 10 and has two hooks 161 that are spaced apart along an upper edge of the rod 16. One transverse end 162 of the connecting rod 16 is aligned with the position of the cover-lifting button 13, and has a hole 164 which receives a pin 133 on the inner surface of the cover-lifting button 13. When the cover-lifting button 13 is pressed, the button 13 can actually push the end 162 of the rod 16, and therefore the rod 16, in a sideway direction indicated by the arrow A1.

The motor and decelerating gear unit 14 has a plurality of gears that are interconnected in a manner to translate rotational movement. The roller unit 17 is positioned inside the lower cover 11, and has one elongated roller 17a and two blocking pieces 17b spaced apart along a front edge of a roller plate 17c for blocking the suction opening 111. The motor and decelerating gear unit 14 is drivably connected to the roller 17a of the roller unit 17 so that the rotational movement can be translated from the motor and decelerating gear unit 14 to the roller 17a. The construction, connection and operation of the motor and decelerating gear unit 14 and the roller 17a are well-known in the art and are not explained in further detail.

The data reading device 18 functions to read data from an optical disk 70, and has a disk reading device (e.g., an optical pick up head) and a spindle motor (not shown), among other elements. The construction and operation of the data reading device 18 are well-known in the art and are not explained in further detail.

Figure 10:
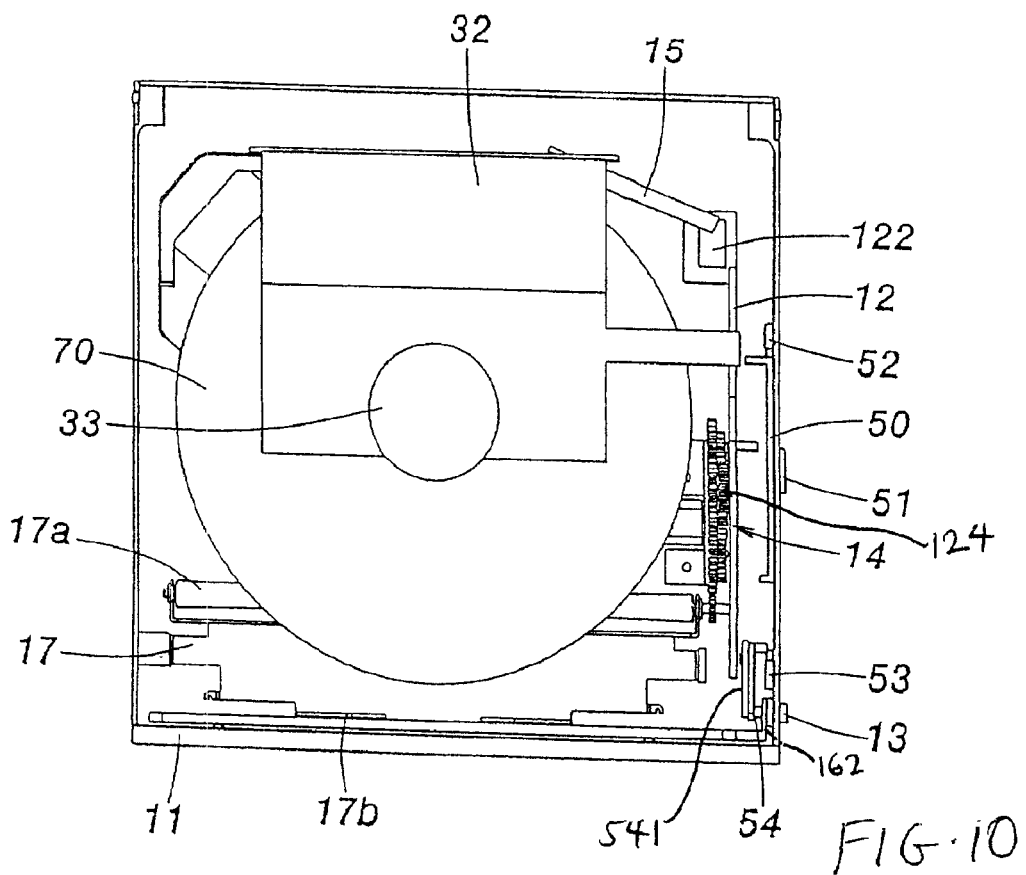
FIG. 10 is a top plan view of the optical disk reading device of FIG. 5 showing an optical disk being loaded via a suction opening in the front wall.

The function switching device 50 can be embodied in the form of a vertical slide button 51 that has a rear flange 55, a suction mode limit switch 52 that is spaced apart from the rear flange 55, a cover-lifting mode limit switch 53 that is spaced apart from a front edge 56 of the slide button 51, and a bolt locker 54 that is also spaced apart from the front edge 56. The bolt locker 54 is operationally coupled to the cover-lifting button 13 to control the operation of the cover-lifting button 13. As best shown in FIG. 10, the bolt locker 54 is rotatably mounted onto a piece 541 that is fixed to the lower cover 11, and is positioned on the inner side of the transverse end 162, so that the transverse end 162 is positioned between the cover-lifting button 13 and the bolt locker 54. All the elements of the function switching device 50 are positioned in the lower cover 11. The slide button 51 has a block 57 extending from an outer vertical surface thereof, with the block 57 slidably received inside a slot 20 formed in the side wall 114 of the lower cover 11. The rear flange 55 extends inwardly and is adapted to engage the extension 121 of the control rack 12 so that the control rack 12 can move in the same direction together with the slide button 51. When the slide button 51 is pushed backward towards the rear, the slide button 51 will contact the suction mode limit switch 52. When the slide button 51 is pushed forward towards the front, the slide button 51 will contact the cover-lifting mode limit switch 53. Thus, the slide button 51 is used to control operation from the suction mode to the cover-lifting mode, and vice versa.

The upper cover assembly 30 includes an upper cover 31, a clamp support 32, and a clamp 33. Two sockets 34 are formed at the rear edge of the upper cover 31 and are adapted to pivotably receive corresponding bolts 19 that are aligned adjacent the rear wall 113 of the lower cover 11. The sockets 34 and bolts 19 are pivotably coupled to each other so that the upper cover assembly 30 can be pivoted with respect to the lower cover assembly 10 to open and close the upper cover assembly 30. Two barbs 37 are formed on the front edge of the upper cover 31 and are adapted to releasably engage corresponding hooks 161 of the connecting rod 16 for the purpose of securing the upper cover 31 to the lower cover 11.

The rear end 321 of the clamp support 32 has a pair of opposing pivot shafts 322 that are adapted to be pivotably coupled to the bottom (inner) side of the upper cover 31. An arm 35 extends laterally from one side of the clamp support 32, and has a contact part 36 that extends vertically from the end of the arm 35. The contact part 36 is adapted to travel along the first guiding surface 123 of the control rack 12.

The clamp 33 is fixed on the clamp support 32 by sliding the clamp 33 into a generally circular opening 323 at the front edge of the clamp support 32, with the clamp 33 having an annular groove that receives the edges of the circular opening 323. An optical disk 70 can be secured inside the optical disk drive 8 by the clamp 33 after the disk 70 is set on the rotary plate 181 of the principal axis motor of the data reading unit 18. In this manner, the optical disk 70 can be fixed on the principal axis rotary plate of the data reading unit 18 that rotates at a high speed to read the data on the optical disk 70.

Figure 6:
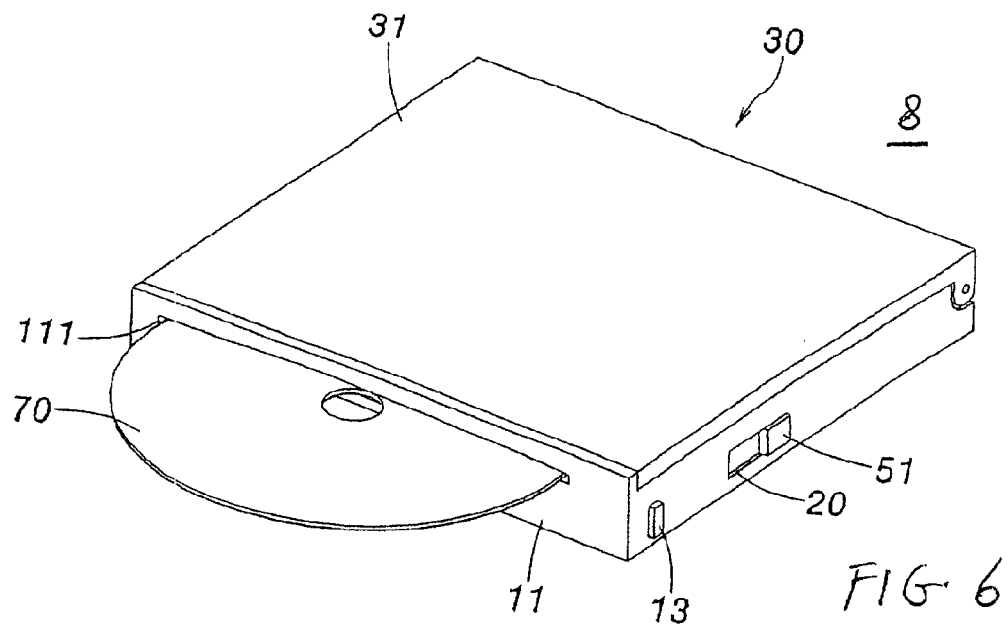
FIG. 6 is a perspective view of the optical disk reading device of FIG. 5 showing an optical disk being loaded via a suction opening in the front wall.
Figure 7:
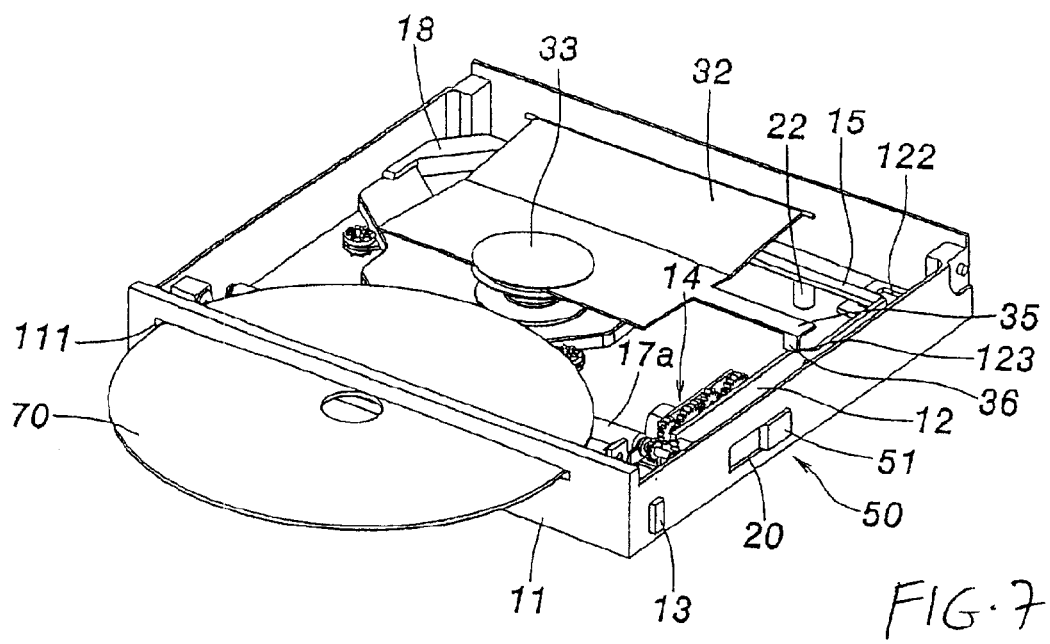
FIGS. 7–9 are cut-away perspective views of relevant portions the optical disk reading device of FIG. 5 showing an optical disk being loaded via a suction opening in the front wall.

FIGS. 6–11 illustrate the operation of the optical disk drive 8 in the suction mode, with an optical disk 70 being loaded via the opening 111. As shown in FIGS. 6 and 7, when the function switching device 50 is in the suction mode, the slide button 51 is at the rear of the slot 20, and the optical disk 70 is shown being loaded by a suction force into the disk drive 8. The source for the suction force comes from motor and decelerating gear unit 14, which passes the force to the roller 17a of roller unit 17. The roller 17a pushes the optical disk 70 through the opening 111 into the disk drive 8 by applying force to the bottom surface of the disk 70. As the optical disk 70 is being drawn through the opening 111, the rotating gears on the gear unit 14 will move the control rack 12 rearwardly (via the engagement with the toothed edge 124), so that the control rack 12 pushes the contact part 36 of the clamp support 32 upwardly from rear to front along the first guiding surface 123, which in turn will push the clamp support 32 upwardly, as best seen in FIG. 7. This creates a disk receiving space between the data reading unit 18 and the clamp 33 so that the optical disk 70 can be positioned into this disk receiving space.

Figure 8:
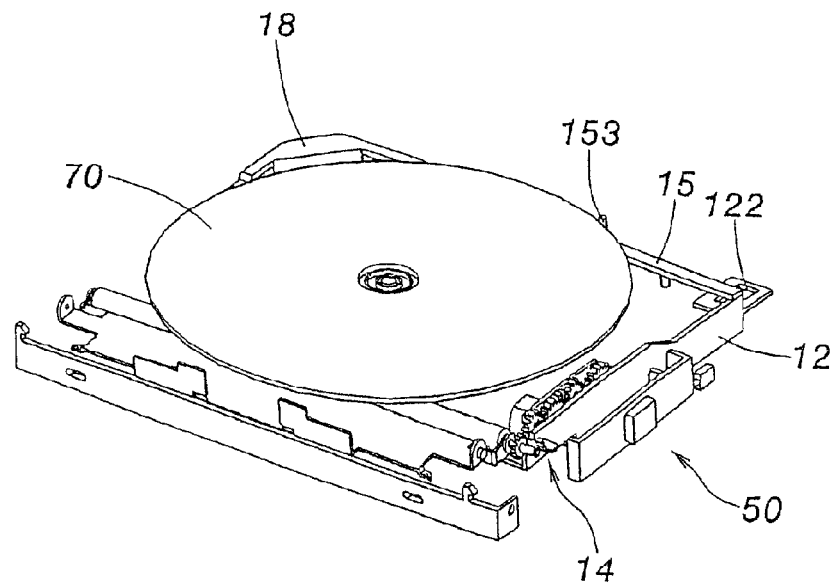

Referring now to FIG. 8, when optical disk 70 reaches a terminal point (i.e., when the optical disk 70 cannot be advanced any further into the disk drive 8), the optical disk 70 pushes the second axle 153 of the clamp-actuating push rod 15 so that push rod 15 pivots about the axis of the pivot 151. Compare FIG. 8 with FIG. 9. Pivoting the push rod 15 about the pivot 151 will cause the first axle 152 to advance towards the front, thereby pushing the control rack 12 towards the front, causing the tooth face 124 on the control rack 12 to be engaged with the gear of the motor and decelerating gear unit 14. The gears of the motor and decelerating gear unit 14 will rotate, thereby advancing the drive control rack 12 towards the front to the position shown in FIG. 9.

Figure 9:
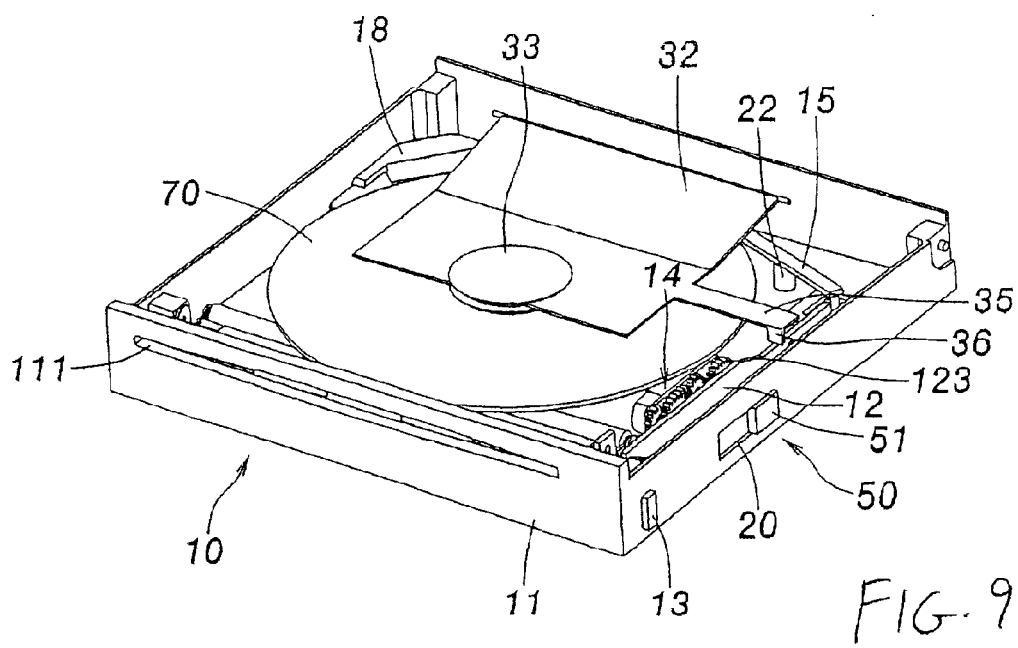

As shown in FIG. 9, the forward movement of the control rack 12 will cause the contact part 36 of the clamp support 32 to move downwardly from front to rear along the first guiding surface 123, thereby moving the clamp support 32 and the clamp 33 downwardly to clamp the optical disk 70. At this time, the second guiding surface 125 pushes the shaft 17d of the roller 17a of roller unit 17 downward along the surface 125 to move the roller 17a downward. As a result, the roller 17a is released from contact with the optical disk 70, so that the optical disk 70 can descend to a position where it can be accessed by the data reading unit 18. The disk loading process using the suction mode is then completed.

Figure 11:
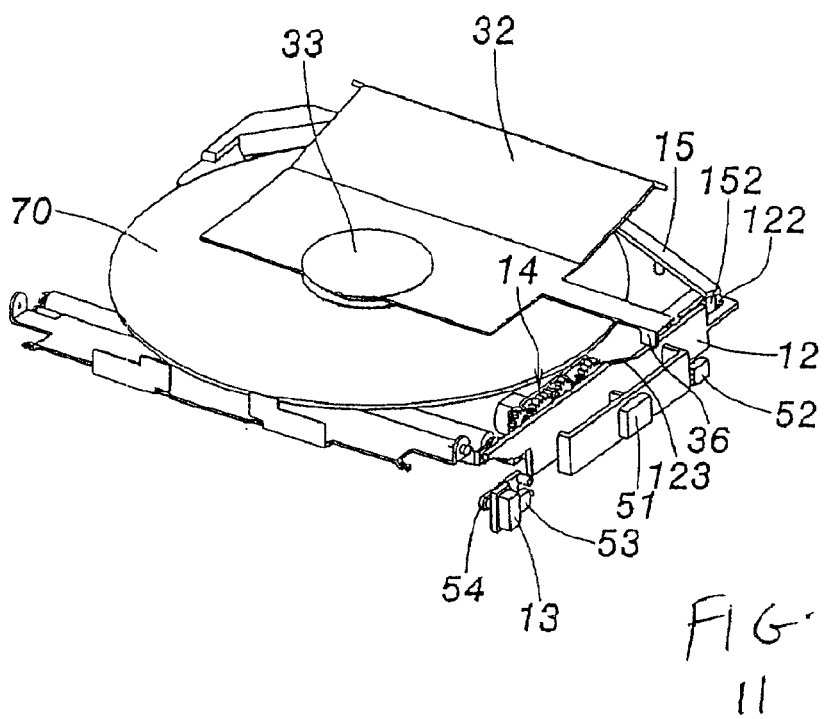
FIG. 11 is a cut-away perspective view of the optical disk reading device of FIG. 5 showing an optical disk after it has been loaded via a suction opening in the front wall.

At this time, as shown in FIGS. 9 and 10, the slide button 51 has not moved and is therefore kept in contact with the suction mode limit switch 52 at the rear of the slot 20. Thus, the disk drive 8 is operating in the suction mode. In the meantime, as shown in FIGS. 10 and 11, the bolt locker 54 is positioned behind the transverse end 162 to prevent the cover-lifting button 13 from pushing the transverse end 162 inwardly, so that the upper cover 31 will not be mistakenly opened by touching or pressing the cover-lifting button 13.

To eject a disk 70 when the slide button 51 is at the rear of the slot 20 in the suction mode, the user presses an eject button (not shown) that is conventionally provided on one of the walls of the lower cover 11. Pressing the eject button will generate an eject command (using principles well-known in the art) that will cause the motor and decelerating gear unit 14 to rotate in a reverse direction (compared to when a disk 70 is being loaded), pushing the control rack 12 towards the rear (via the engagement with the toothed edge 124). As the surface 125 of the control rack 12 separates from its guiding contact with the roller shaft 17d, the roller 17a is not longer supported or pushed by the control rack 12, so that the roller 17a can move upwardly to return to its original position where the roller 17a pushes the bottom surface of the disk 70 to grip the disk 70. The controller of the disk drive 8 then reverses the rotation of the motor and decelerating gear unit 14 so that the roller 17a can push the disk 70 out of the disk drive 8 via the opening 111.

Figure 12:
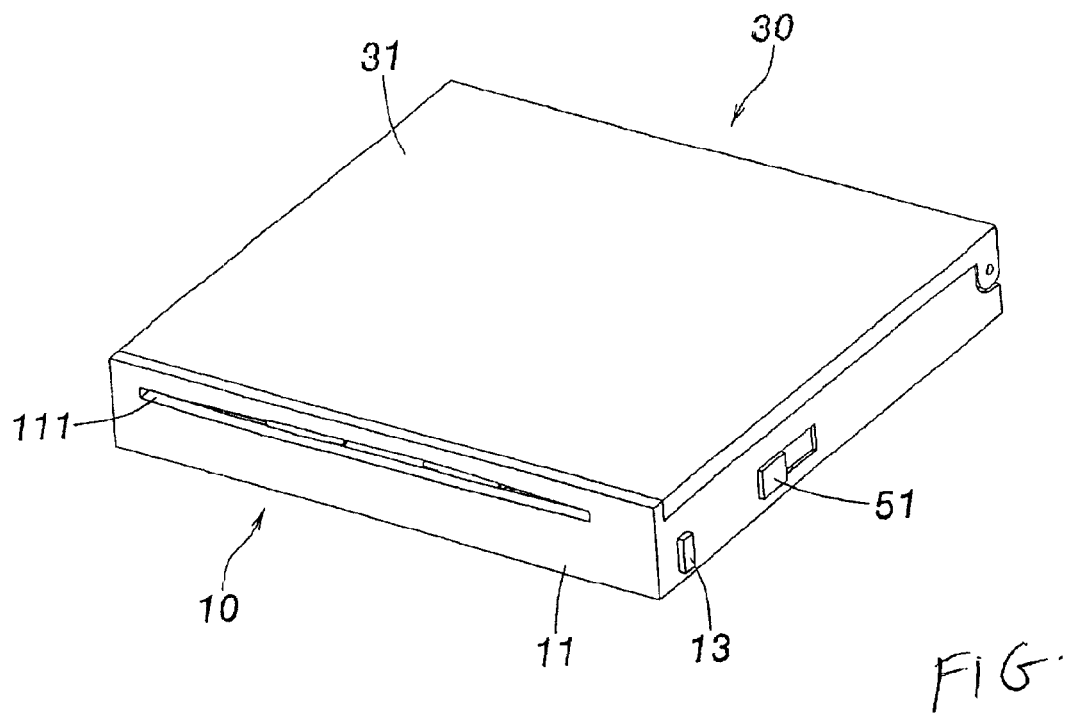
FIG. 12 is a perspective view of the optical disk reading device of FIG. 5 showing the function switching device being switched to operation in a cover-lifting mode.
Figure 13:
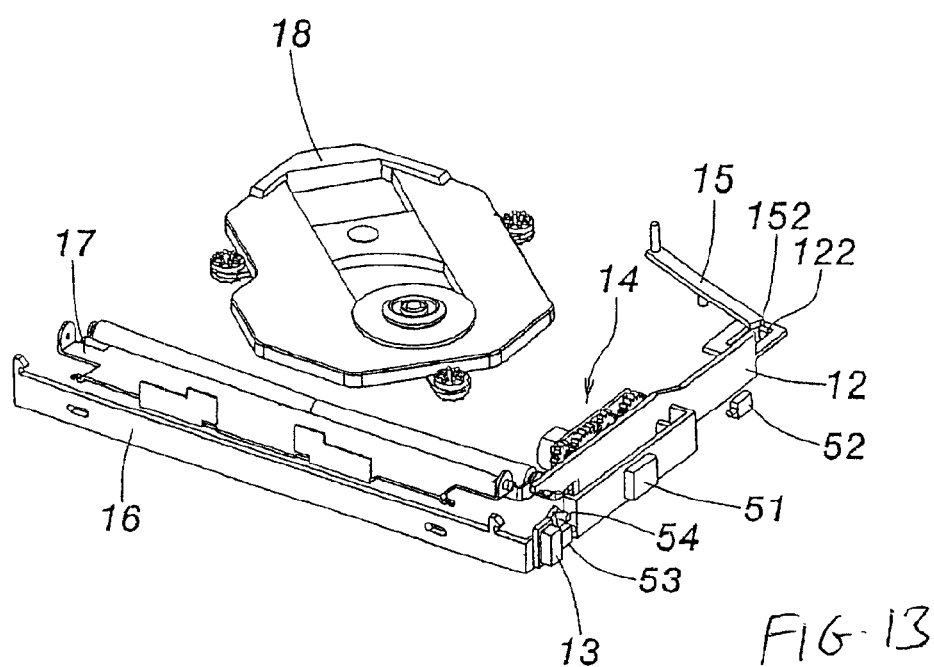
FIG. 13 is a cut-away perspective view of relevant portions of the optical disk reading device of FIG. 5 shown during operation in the cover-lifting mode.
Figure 14:
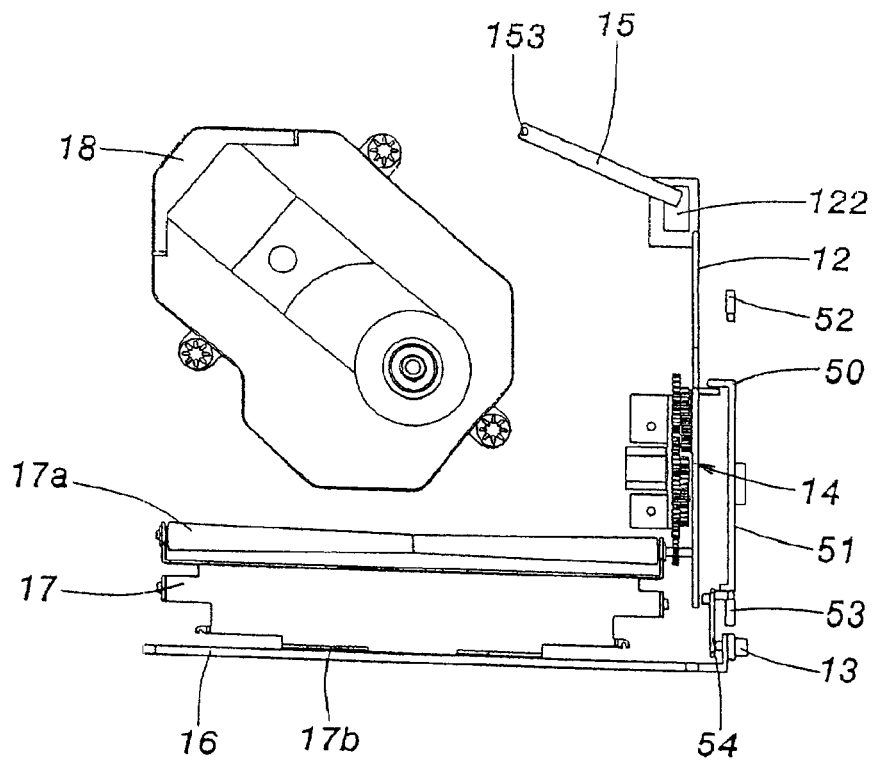
FIG. 14 is a top plan view of relevant portions of the optical disk reading device of FIG. 5 shown during operation in the cover-lifting mode.

The operation of the optical disk drive 8 in the cover-lifting mode will now be illustrated in connection with FIGS. 12–17. As shown in FIG. 12, when the function switching device 50 is in the cover-lifting mode, the slide button 51 is shifted forward in the slot 20. At this time, as shown in FIGS. 13 and 14, the forward movement of the slide button 51 also moves the control rack 12 in the forward direction (because the rear flange 55 pulls the extension 121 forward), which: (1) causes the roller 17a to descend because the shaft 17d is guided downwardly and rearwardly by the guide surface 125; and (2) causes the blocking pieces 17b to ascend to block the opening 111 to prevent an optical disk 70 from being introduced via a suction mode into the opening 111.

Figure 15:
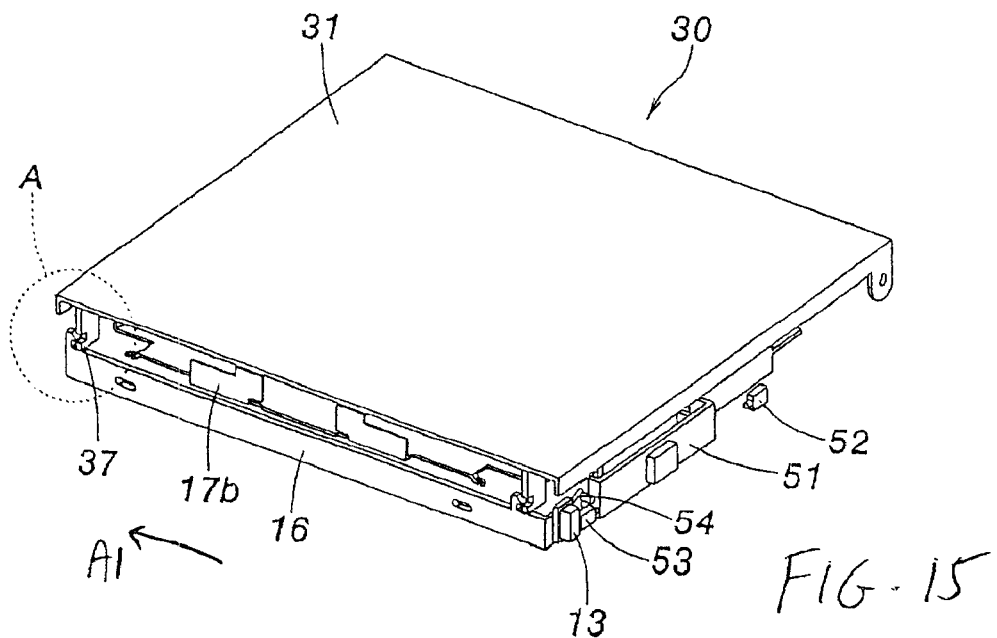
FIG. 15 is a perspective view of relevant portions of the optical disk reading device of FIG. 5 showing how the upper cover assembly is connected to the lower cover assembly.
Figure 16:
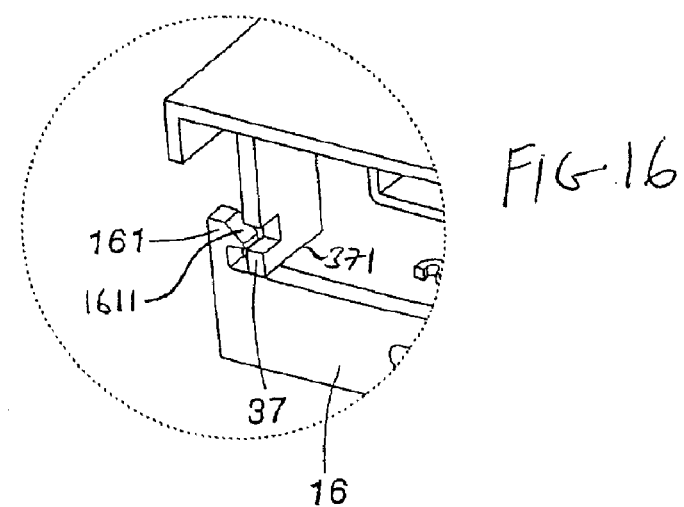
FIG. 16 is an expanded perspective view of the area A in FIG. 15.
Figure 17:
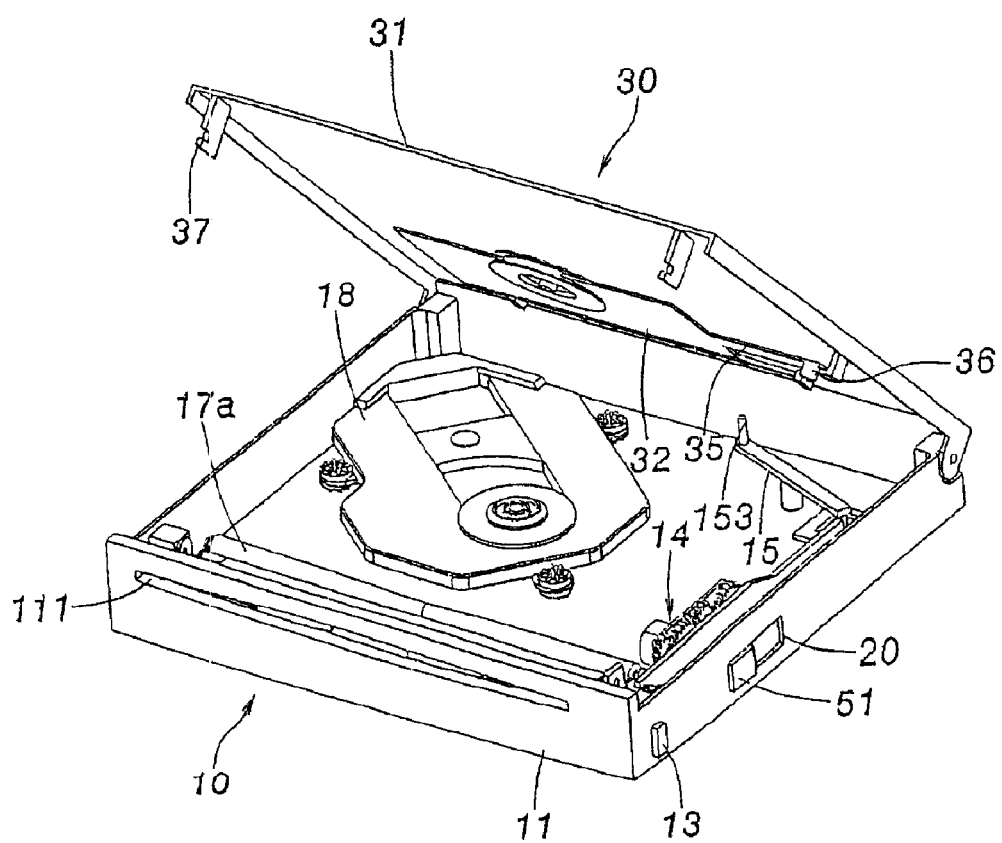
FIG. 17 is a perspective view of the optical disk reading device of FIG. 5 shown with its cover being opened during operation in the cover-lifting mode.

The forward movement of the slide button 51 also releases its contact with the suction mode limit switch 52, and brings the slide button 51 into contact with the cover-lifting mode limit switch 53. The forward movement of the slide button 51 also pushes the bolt locker 54 in an anti-clockwise direction (see FIGS. 13 and 15) because the front edge 56 of the slide button 51 pushes the bolt locker 54 to release the blocking contact of the bolt locker 54 on the transverse end 162, so that the user can press the cover-lifting button 13 to open upper cover 31. As shown in FIG. 15, when the cover-lifting button 13 is pressed, the button 13 pushes the transverse end 162 of the connecting rod 16 to move the connecting rod 16 sideways in the direction of arrow A1, thereby causing the hooks 161 of the connecting rod 16 to be disengaged or separated from the barbs 37 on the upper cover 31 (as shown in greater detail in FIG. 16). The user can then lift up the upper cover 31 to manually place an optical disk 70 into the disk drive 8, as shown in FIG. 17.

At this time, the user can close the upper cover 31 in the following manner. After the button 13 pushes the rod 16 in the direction of arrow A1 and the hooks 161 of the connecting rod 16 are disengaged from the barbs 37 on the upper cover 31, a biasing element (not shown), such as a spring, will bias the rod 16 back in a direction opposite to the direction of arrow A1. The user presses the upper cover 31 back downwardly, and the bottom 371 of each barb 37 will slide down a ramped or angled surface 1611 of each corresponding hook 161, which pushes the rod 16 in the direction of arrow A1. This sideway movement of the rod 16 will allow each barb 37 to be received inside each corresponding hook 161, and the biasing element will bias the rod 16 back in a direction opposite to the direction of arrow A1 to cause each set of barb 37 and hook 161 to be re-engaged, thereby locking the upper cover 31 to the lower cover 11. The disk drive 8 is now ready to read the disk 70.

To eject a disk 70 when the slide button 51 is at the front of the slot 20 in the cover-lifting mode, the user merely pushes the button 13, which in turn pushes the rod 16 in the direction of arrow A1, disengaging the barbs 37 from the hooks 161. The user can then lift up the upper cover 31 to manually remove the optical disk 70. The user can then close the upper cover 31 in the manner described above.

As a result, according to the present invention, when the function switching device 50 is in the suction mode, the upper cover assembly 30 is locked together with the lower cover assembly 10 so that the upper cover assembly 30 cannot be opened. The optical disk 70 can then be loaded via the disk suction opening 111. When the optical disk 70 is inserted into disk suction opening 111, the suction function will be started to automatically suck the optical disk 70 into the disk drive 8 to complete the loading process. Data can then be read from the optical disk 70 using the data reading unit 18.

When the function switching device 50 is in the cover-lifting mode, the sucking function is locked and cannot work. On the other hand, the upper cover assembly 30 is released and can be opened by simply pressing the cover-lifting button 13 so that the optical disk 70 can be loaded manually. After the disk 70 has been loaded, the upper cover assembly 30 can be pressed down and closed to complete the loading operation. Data can then be read from the optical disk 70 using the data reading unit 18.

Therefore, the present invention utilizes the principles of a suction type disk loading and ejection system and adds a disk loading and ejection function switching device 50. Under normal circumstances, the disk drive 8 of the present invention can utilize the advantages of a suction type disk drive so that the user can enjoy the convenience and fun of the suction type loading and ejection method. When it is necessary to use an optical disk 70 that has an irregular external shape, the function switching device 50 can be switched to the cover-lifting mode so that the optical disk 70 can be loaded and read. Thus, the present invention provides the advantages of both the suction type and cover-lifting type optical disk drive.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A disk reading device, comprising:
   a lower cover having a wall with an elongated opening provided in the wall;
   an upper cover that is connected for pivoting movement with respect to the lower cover;
   a disk receiving space between the lower and upper covers, and being accessible via the elongated opening in a suction mode and by opening the upper cover with respect to the lower cover in a cover-lifting mode;
   means for drawing a disk via the elongated opening into the disk receiving space;
   means coupled to the upper and lower covers for opening the upper cover with respect to the lower cover; and
   means for switching operation of the disk reading device from the suction mode to the cover-lifting mode.

2. The device of claim 1, wherein the switching means includes means for locking the upper cover to the lower cover while a disk is being loaded via the elongated opening in the suction mode.

3. The device of claim 2, wherein the opening means includes a button, and wherein the locking means includes a connecting rod that is coupled to the button and which is removably coupled to the upper cover, and a bolt locker that is positioned to block movement of the connecting rod and the button.

4. The device of claim 1, wherein the switching means includes a first switch for actuating the suction mode, a second switch for actuating the cover-lifting mode, and a slide button that slidably contacts either the first switch or the second switch.

5. The device of claim 4, wherein the drawing means includes a roller, a gear unit operatively coupled to the roller, and a control rack that is operatively coupled to the gear unit, with the control rack coupled for simultaneous movement with the slide button.

6. The device of claim 1, further including means for clamping a disk, with the clamping means operatively coupled to the drawing means.

7. A method of loading a plurality of disks at separate times into a disk receiving space in a disk reading device that receives disks in different receiving modes, comprising:
   providing a disk reading device having a lower cover having a wall with an elongated opening provided in the wall, and an upper cover that is connected for pivoting movement with respect to the lower cover;
   inserting a disk into the disk reading device via the elongated opening;
   removing the disk from the disk reading device via the elongated opening;
   actuating a switch to change the receiving mode of the disk reading device;
   opening the upper cover with respect to the lower cover;
   manually placing a disk inside the disk reading device; and
   closing the upper cover.

8. The method of claim 7, further including:
   prior to inserting a disk into the disk reading device via the elongated opening, locking the upper cover so that it cannot be opened with respect to the lower cover.

9. The method of claim 8, wherein the step of actuating a switch includes:
   unlocking the upper cover so that it can be opened with respect to the lower cover.

10. The method of claim 7, further including:
    opening the upper cover with respect to the lower cover;
    manually removing the disk inside the disk reading device;
    locking the upper cover so that it cannot be opened with respect to the lower cover; and
    inserting a disk into the disk reading device via the elongated opening.

11. A disk reading device, comprising:
    a lower cover having a wall with an elongated opening provided in the wall;
    an upper cover that is connected for pivoting movement with respect to the lower cover;
    a disk receiving space between the lower and upper covers, and being accessible via the elongated opening and by opening the upper cover with respect to the lower cover;
    a roller positioned between the upper cover and lower cover, and adjacent the elongated opening;
    a rod retained inside the lower housing and removably engaging a portion of the upper cover;
    a button operatively coupled to the rod in a manner such that the rod disengages the upper cover when the button pushes the rod;
    a locker coupled to the rod and the button for preventing the button from pushing the rod; and
    a switch that is operatively coupled to the locker for unlocking the locker so that the button can push the rod.

12. The device of claim 11, further including:
    a motor and gear unit that is coupled to the roller for rotating the roller; and
    a control rack that is operationally coupled to the roller, the motor and gear unit, and the switch for moving the roller away from the elongated opening.

* * * * *